(12) United States Patent
Shishido et al.

(10) Patent No.: US 7,581,179 B2
(45) Date of Patent: Aug. 25, 2009

(54) INFORMATION RETRIEVING APPARATUS

(75) Inventors: Kan Shishido, Haga-gun (JP); Koichi Kojima, Utsunomiya (JP); Hirofumi Kinoshita, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 473 days.

(21) Appl. No.: 11/097,175

(22) Filed: Apr. 4, 2005

(65) Prior Publication Data

US 2005/0219207 A1 Oct. 6, 2005

(30) Foreign Application Priority Data

Apr. 6, 2004 (JP) .............................. 2004-112202

(51) Int. Cl.
*G06F 17/21* (2006.01)
*G06F 17/24* (2006.01)

(52) U.S. Cl. ...................... 715/256; 715/255; 715/257; 715/259; 715/261; 715/773; 715/816; 715/864; 715/865

(58) Field of Classification Search ......... 715/531–532, 715/773, 816, 828, 255–257, 259, 261, 864, 715/865
See application file for complete search history.

(56) References Cited

U.S. PATENT DOCUMENTS

| | | | | |
|---|---|---|---|---|
| 6,088,649 | A * | 7/2000 | Kadaba et al. | 701/201 |
| 6,392,640 | B1 * | 5/2002 | Will | 345/184 |
| 6,734,881 | B1 * | 5/2004 | Will | 715/811 |
| 7,152,213 | B2 * | 12/2006 | Pu et al. | 715/812 |
| 2003/0067495 | A1 * | 4/2003 | Pu et al. | 345/811 |
| 2004/0021691 | A1 * | 2/2004 | Dostie et al. | 345/773 |
| 2005/0210402 | A1 * | 9/2005 | Gunn et al. | 715/773 |

FOREIGN PATENT DOCUMENTS

| | | |
|---|---|---|
| JP | 09-160910 | 6/1997 |
| JP | 11 272386 | 10/1999 |

OTHER PUBLICATIONS

Japanese Office Action dated Dec. 19, 2008, 4 pages.

* cited by examiner

*Primary Examiner*—Joshua D Campbell
(74) *Attorney, Agent, or Firm*—Arent Fox LLP

(57) ABSTRACT

An information retrieving apparatus for retrieving predetermined information according to an input of text information, including an input operation section which selects characters from a defined predetermined character list and performs input instructions, a display section which displays the character list, and input characters which have been instructed by the input operation section, a candidate definition processing section 10, and a candidate display processing section 10. The candidate definition processing section 10 retrieves input candidates containing the input instructed characters, and extracts candidate characters, and temporarily allocates the candidate characters to display areas 29 in the display section 15 of characters that do not match the candidate characters, so that they can be selected using the input operation section. The candidate display processing section 10 displays the characters in the display areas, allocated by the candidate definition processing section in the display section, differentiating selectable characters.

5 Claims, 6 Drawing Sheets

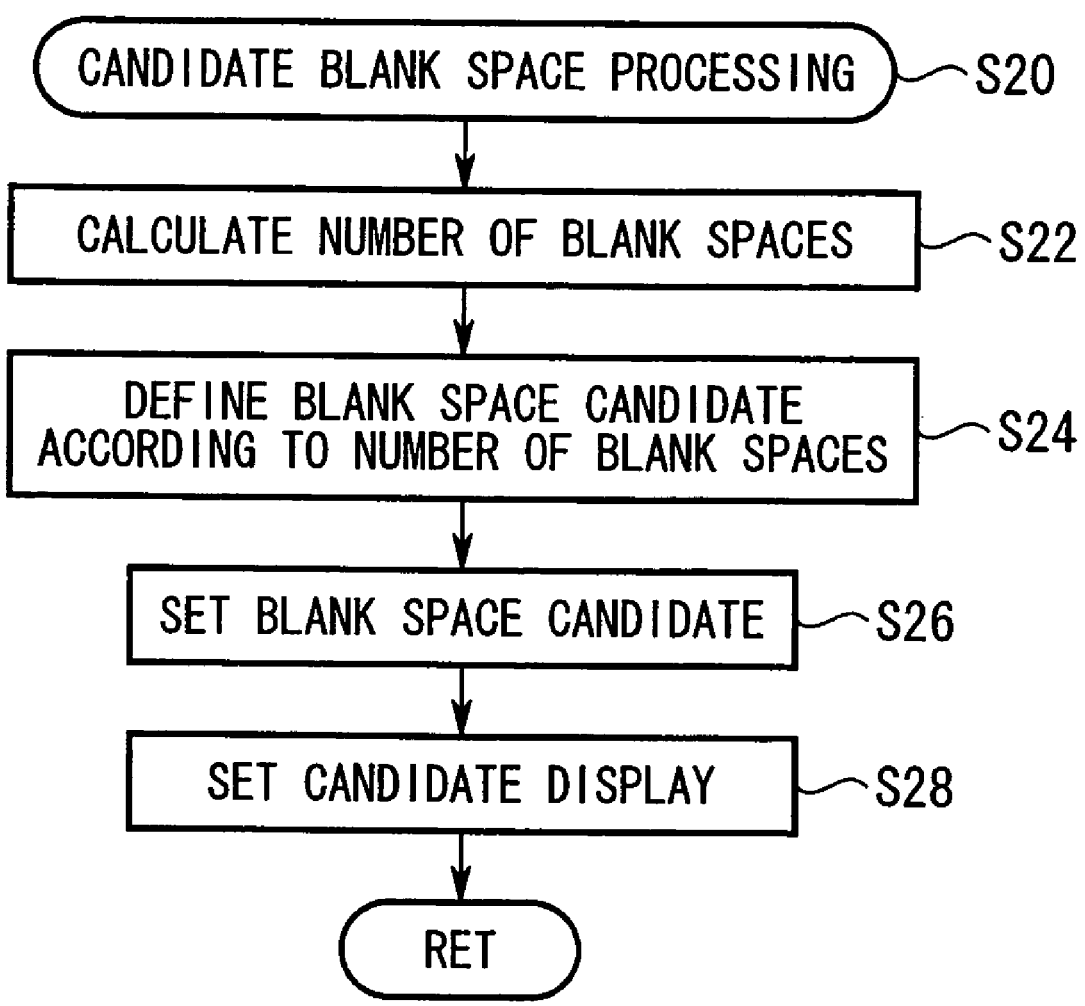

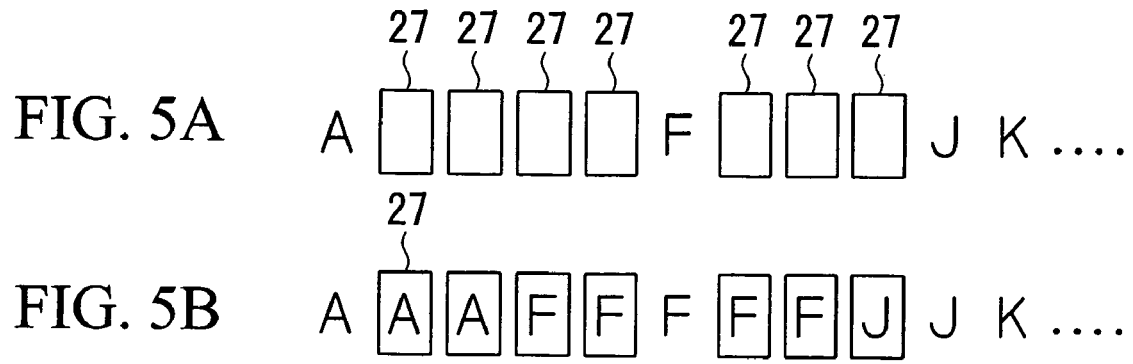
FIG. 5A
FIG. 5B
FIG. 6
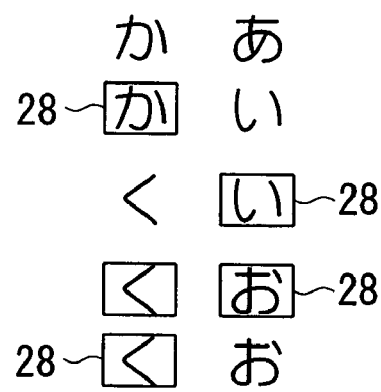

INFORMATION RETRIEVING APPARATUS

BACKGROUND OF THE INVENTION

1. Field of the Invention

Priority is claimed to Japanese application No. 2004-112202, filed Apr. 6, 2004, which is incorporated herein by reference.

The present invention relates to an information retrieving apparatus which retrieves predetermined information according to input of character information, and in particular, relates to an information retrieving apparatus suitable for use when installed in a mobile object such as a vehicle or the like.

2. Description of Related Art

In recent years, information retrieving apparatuses have been proposed for retrieving predetermined information, such as a destination or the like, according to text information input from an input operation section such as a keyboard or the like.

For example, Japanese Unexamined Patent Application, First Publication No. 11-272386 proposes a technique in which a succeeding input candidate from a virtual keyboard is displayed with reference to input history.

However, there is a problem in the conventional technique as follows. That is, when performing input of text information, and as candidate characters to be retrieved as objects become limited, some characters are not detected in the character list as appropriate candidate characters. Accordingly, when candidate characters are limited and as a number of selectable characters are reduced, it becomes necessary to skip non-selectable characters in the character list. As a result, as the number of selectable characters becomes limited, and the number of selectable characters in the character list is reduced, the amount of selection processing changes and the number of input operations changes, and hence operator's feeling of the input operation changes.

Furthermore, in an information retrieving apparatus installed in a moving object such as a vehicle or the like, it is desirable from the standpoint of operability and convenience, to be able to input information without having to look at a display screen. However, if feeling of the input operation changes as described above, the operation must be performed while looking at a display screen for coping with reduction of selectable characters. Therefore, the conventional technique involves a problem from the standpoint of operability and convenience.

Moreover, in an information retrieving apparatus installed in a moving object, sometimes a jog dial or the like, capable being operated by one hand, is used. However, in such a case, if the number of selectable characters is changed, the operating rotation angle for retrieving characters changes greatly at the same time. Therefore, there is a problem in that it may cause errors.

SUMMARY OF THE INVENTION

Accordingly, an object of the present invention is to provide an information retrieving apparatus that can maintain the sense of operation even if candidates, being objects to be retrieved, are limited so that the number of selectable characters changes, and thus enable improvement in operability and convenience.

One aspect of the present invention provides an information retrieving apparatus (for example, the information retrieving apparatus 1 of the embodiment) which retrieves predetermined information according to an input of text information, comprising an input operation section (for example, the input operation section 13 of the embodiment) which selects characters from a defined predetermined character list and performs input instructions of selected characters, a display section (for example, the image display section 15 of the embodiment) which displays said character list and input instructed characters which have been input according to the input instructions performed by said input operation section, a succeeding input candidate character selection section (for example, the ECU 10 of the embodiment) which retrieves input candidate characters containing said input instructed characters and extracts (for example, step S16 of the embodiment) a character immediately after said input instructed characters in the retrieved input candidates as a candidate character (for example, the selectable characters of the embodiment), and a candidate definition processing section (for example, the ECU 10 of the embodiment) which temporarily allocates said candidate character to a display area of inappropriate characters in said display section (for example, the display areas 29 of the embodiment) of characters (for example, the non-selectable characters of the embodiment) as said candidate character, so that they can be selected using said input operation section (for example, the processes of steps S24 and S26 of the embodiment), and a candidate display processing section which displays character in said display area which area is allocated temporarily by said candidate definition processing section, differentiating selectable characters using a succeeding input candidate selection section.

According to this invention, when the input instruction characters are selected by the input operation section, input candidate characters containing the input instruction characters are retrieved by the candidate definition processing section. At this time, selection processing is performed by temporarily allocating the candidate characters to the display areas of characters that are inappropriate as the candidate characters, among the retrieved input candidates. As a result, even if there is a character that are inappropriate to a candidate character in the character list, it is possible to operate without changing the amount of processing and the number of operations, when selecting a candidate character adjacent to the candidate character currently selected. Accordingly, even if the number of selectable characters changes, it is possible to select predetermined characters by the same operation as before the number of candidate characters is limited. Therefore, it is possible to maintain the sense of operation, and thus operability and convenience can be improved.

Furthermore, by differentiating the allocated characters displayed in display areas, from the selectable characters and displaying using the candidate display processing section, it is possible to easily visualize the display areas of selectable characters, and the display areas that are allocated to selectable characters in display areas of non-selectable characters, and hence it is possible to increase convenience.

The other aspect of the invention is that described in the preceding aspect, and is characterized in that the candidate definition processing section sets either one or two candidate characters adjacent to the display area as characters to be allocated to the display area.

According to this aspect of the invention, even if the number of selectable characters changes, it is possible to maintain the same feeling of input operation as before the number of characters becomes limited. Therefore it is not necessary to check the display screen point by point, and if the display screen is checked when selecting a candidate character adjacent to the candidate character currently selected, it is possible to reduce the amount of processing and the number of operations. Therefore, it is possible to further enhance the operability and convenience.

According to the first aspect of the invention, even if the number of selectable characters changes, it is possible to select predetermined characters by the same operation as before the number of candidate characters are limited. Therefore, it is possible to maintain the feeling of input operation, and thus the operability and convenience can be improved.

According to the second aspect of the invention, since it is possible to reduce the amount of processing and the number of operations, it is possible to further enhance the operability and convenience.

BRIEF DESCRIPTION OF THE DRAWINGS

FIG. 3 is a flow chart showing the content of candidate blank space processing of FIG. 2.

FIGS. 5A and 5B are explanatory diagrams showing the internal processing content of an ECU 10, which temporarily defines character data areas (blank spaces) of non-selectable characters in a character list as character data of selectable characters.

FIG. 6 is an explanatory diagram showing alternative internal processing content of the ECU 10, which temporarily defines character data areas (blank spaces) of non-selectable characters in a character list as character data of selectable characters.

DETAILED DESCRIPTION OF THE INVENTION

Hereunder is a description of information retrieving apparatus according to an embodiment of the present invention with reference to drawings.

Figure 1:
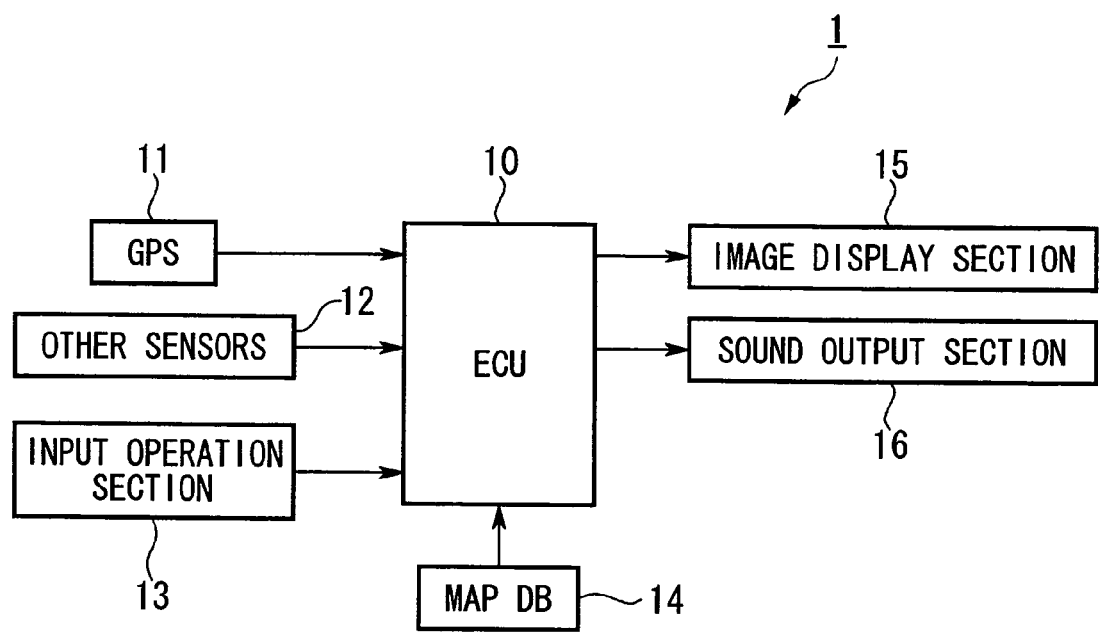
FIG. 1 is a block diagram of an information retrieving apparatus according to an embodiment of the present invention.

FIG. 1 is a block diagram of an information retrieving apparatus according to an embodiment of the present invention. In the present embodiment, a case is described wherein an information retrieving apparatus 1 is installed in a vehicle.

The information retrieving apparatus 1 is provided with an ECU 10 provided with a navigation function. The ECU 10, to which signals are input from each of a GPS sensor 11, an additional sensor (for example, a speed sensor) 12, an input operation section 13, and a map DB (map database) 14, sends outputs to an image display section 15 and a sound output section 16 based on those signals.

Hereunder is a description of each device.

The input operation section 13 is operated by input operations from an operator (an occupant of the vehicle in this case), and it is provided with a function for selecting characters displayed in the image display section 15 via the ECU 10, and a decision function. For the input operation section 13, a jog dial or the like, which can be operated easily by one hand, can be used.

The GPS sensor 11 is a sensor for detecting positional information of a vehicle in which the information retrieving apparatus 1 is installed, and the additional sensor 12 is a sensor for detecting information (for example, speed V, or the like) of the vehicle. Each of the detected values is input to the ECU 10.

The map DB 14 stores display data for displaying map data in which place names, facility names, and the like, are associated with position coordinates, route calculation data for calculating a route between an input location and a destination, route guide data for advising a range of information regarding routes, and information retrieving data.

The image display section 15 displays map data output by the ECU 10, characters input by the input operation section 13, and the like, on the display screen. This will be described in detail later. Furthermore, the sound output section 16 outputs a sound file output by the ECU 10.

The ECU 10 performs data extraction processing, and output processing to the image display section 15 and the sound output section 16, based on map information stored in the map database 14, and input information from the GPS sensor 11, the additional sensor 12, and the input operation section 13.

Figure 4A:
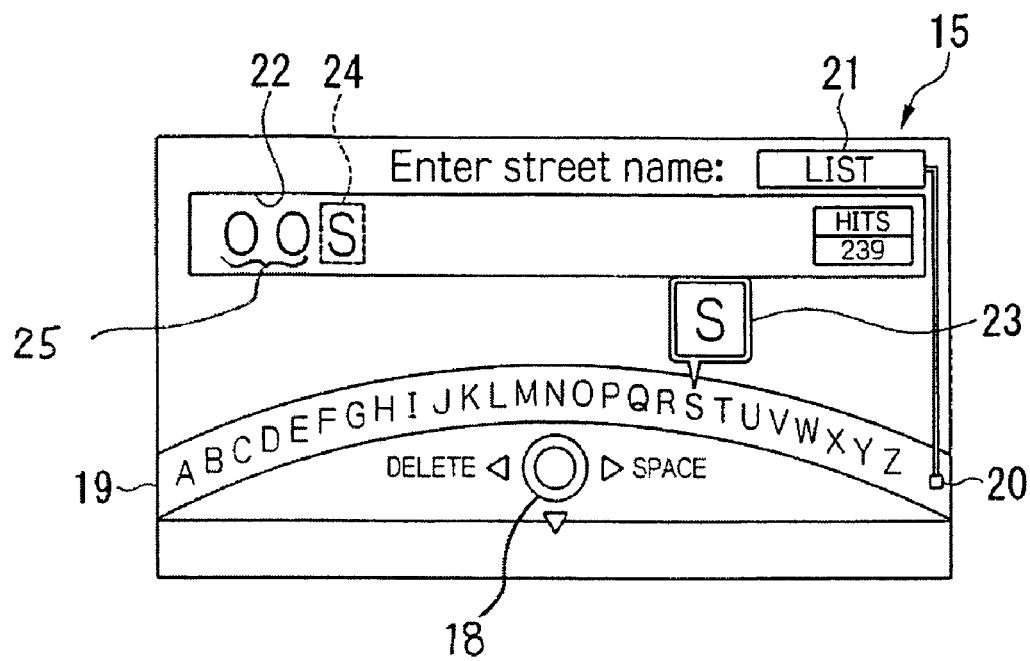
FIGS. 4A and 4B are explanatory diagrams showing display screens of the information retrieving apparatus of FIG. 1.
Figure 4B:
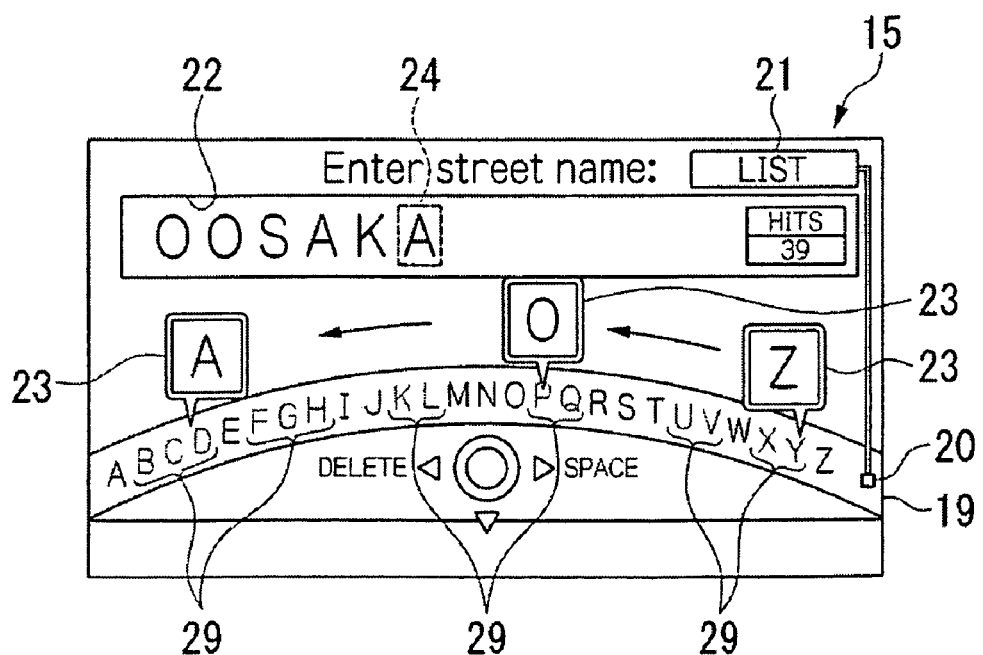
Figure 7A:
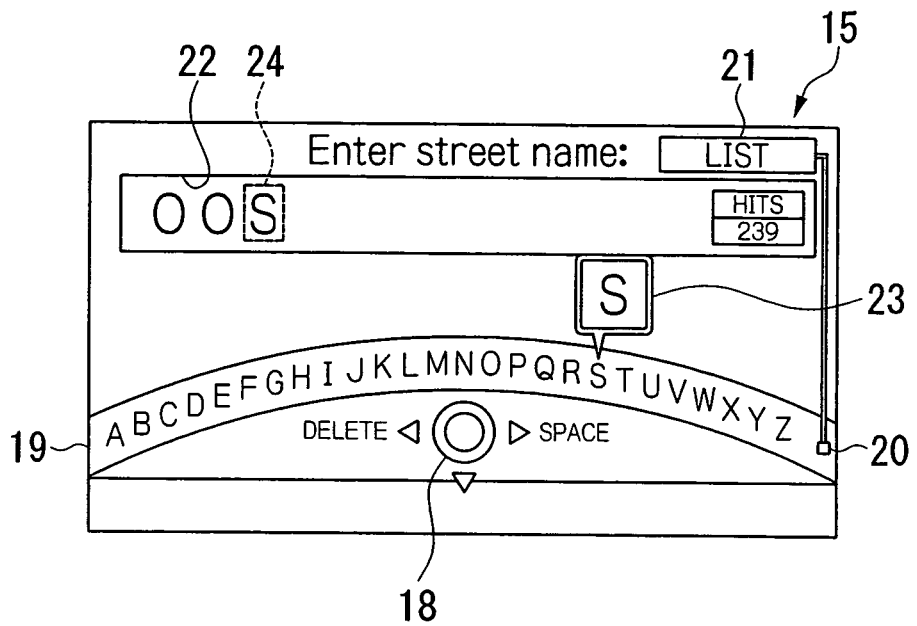
FIGS. 7A and 7B are explanatory diagrams showing display screens of a conventional information retrieving apparatus.
Figure 7B:
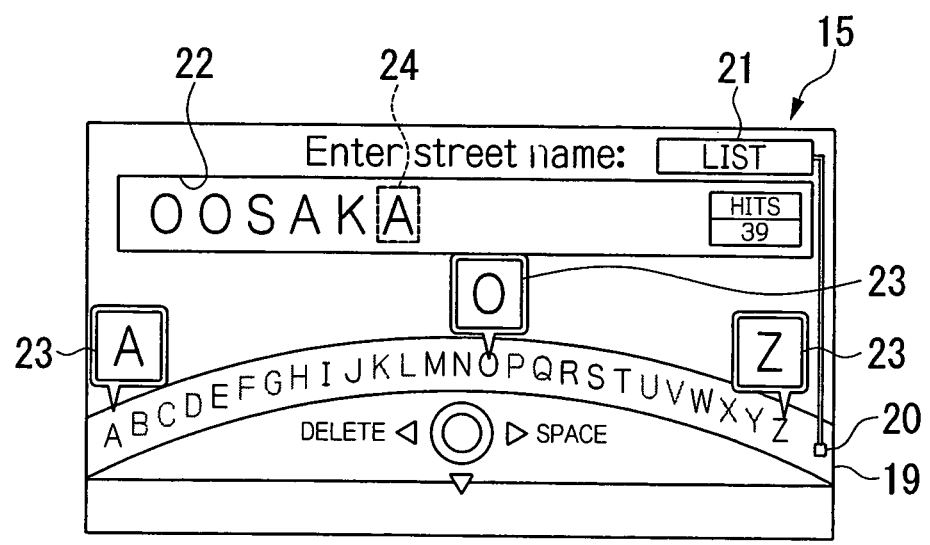

FIGS. 4A and 4B are explanatory diagrams showing display screens of the information retrieving apparatus of FIG. 1. As shown in FIGS. 4A and 4B, an operation section icon 18 is displayed at the center of the bottom of the screen of the display section 15, so that the operator can understand the operating direction and operating function of the input operation section 13. Furthermore, a character list display section 19, which is enclosed in an arc shape, is displayed above the operating section icon 18, which is at the bottom of the display screen. Characters (in this case, capitalized alphabet letters) constituting a character list are arranged at predetermined spacing in this character list display section 19. A selected character display section 23, which shows characters selected by the operation section 13, is shown above the character list display section 19. In an initial screen, a letter (for example, "H"), which is near the center and is used frequently, may be set as the initial location of the selected character display section 23. Moreover, in FIG. 4B and FIG. 7B discussed later, three selected character display sections 23 are displayed on one screen in order to simplify the description. However, in actual use, only one selected character display section 23 is displayed on one screen.

Moreover, an input character display section 22 is formed above the display screen of the display section 15 in a widthwise direction. This input character display section 22 displays an input decision waiting character 24 to be selected by the input operation section 13, and an input decision complete character 25 that has already been selected and decided. Here, a character to be input to the input character display section 22 is selected by rotating the input operation section 13, and a decision is made by pressing on the input operation section 13.

Furthermore, a list display section 21 is displayed above the input character display section 22. The list display section 21 is linked to a list display selection section 20 in the character list display section 19. When decision processing is performed by selecting this list display selection section 20 using the input operation section 13, the list display section 21 is selected. When decision processing is performed when selecting the list display section 21, the process moves to a screen on which a list of input candidates is displayed. Moreover, even if the input operation section 13 is moved upwards while selecting a character in the character list display section 19, it is possible to select the list display section 21. In the embodiment, the setting is such that even in the case where the input operation section 13 selects characters at both sides of the character list display section 19, it is possible to rotate it further beyond the ends, so that characters at the other end can be selected when the rotation operation is continued.

Furthermore, when a character is input in the input character display section 22, and decision processing is performed again, input candidates including the input character 25 are retrieved from the map database 14, and the number of input candidates is displayed as the number of hits. Here, when candidates, being objects to be retrieved, are limited, there are non-selectable characters that are inappropriate as any of the input candidates in the character list. At this time, in the conventional technique, the non-selectable characters are skipped, and selection process moves to selectable characters as in FIG. 7B, so that the operating procedure and feeling of the input operation change.

Conversely, in the present embodiment, a process is performed in which character data of the selectable characters is temporarily allocated to the display areas of the non- selectable characters caused by limiting the objects to be retrieved according to the characters input, so that selection is possible. This will be described using FIG. 2 and FIG. 3.

Figure 2:
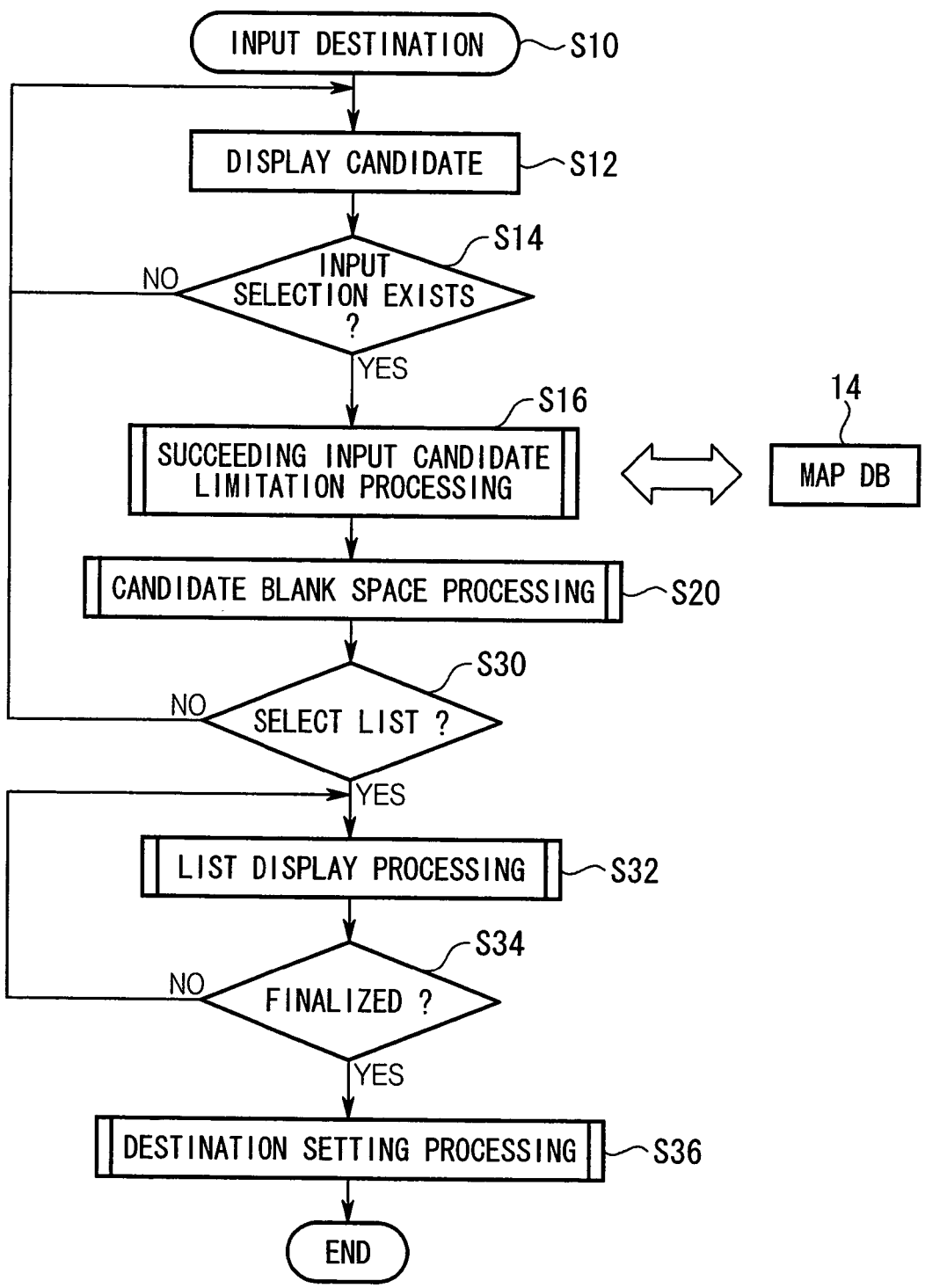
FIG. 2 is a flow chart showing the content of destination setting processing of the information retrieving apparatus of FIG. 1.

FIG. 2 is a flow chart showing the content of destination setting processing. Firstly, in step S10, destination input processing is started to input a character by the input operation section 13. In step S12, an input character is displayed as an input decision complete character 25. Then, in step S14, it is determined whether there is an input selection of the next character or not. In the case where the determination result is yes, the flow proceeds to step S16, while in the case where the determination result is no, the flow returns to step S12.

In step S16, limitation processing for the succeeding input candidate character is performed. That is, candidate characters containing the input decision complete characters are extracted from place names and facility names stored in the map database 14, and the characters immediately after the input instruction characters that the input candidate characters contain are extracted from the character list as selectable characters.

In step S20, the display areas of non-selectable characters are replaced temporarily by display areas of selectable characters, and candidate blank space processing is performed to differentiate the display from the selectable characters. The candidate blank space processing will be described using FIG. 3.

FIG. 3 is a flow chart showing the content of candidate blank space processing. As shown in FIG. 3, in step S22, the character data areas of non-selectable characters displayed among the selectable characters in the character list are made into blank spaces 27, the number of them is calculated, and the number of non-selectable characters calculated is defined as the number of blank spaces. In step S24, blank space candidate definition processing is performed according to the number of blank spaces defined in step S22, in order to temporarily define the display areas 29 of non-selectable characters as selectable characters adjacent to the display areas 29. In step S26, blank space candidate setting is performed to set the characters defined in step S24 as input capable characters. In step S28, the display areas of blank space candidate characters set to blank space candidates in step S26 are temporarily set (displayed dimmed in the present embodiment), and the flow proceeds to step S30. By the above processing, in the case where a display area 29 of a non-selectable character temporarily displayed dimmed is selected, the input capable character adjacent to the display area 29 of the non-selectable character is displayed in the selected character display section 23.

Regarding input candidate display setting, the display setting of blank space candidates is temporarily displayed dimmed in the above-described embodiment. However, it is not limited to this, and can be changed appropriately such as by deleting the characters, changing the colour of the characters, or the like, provided the display is differentiated from the input capable characters.

The above processing will be described in detail using FIG. 5 and FIG. 6.

FIG. 5A, and 5B are explanatory diagrams showing the internal processing content of the ECU 10, which temporarily defines the character data areas (blank spaces 27) of non-selectable characters in the character list as character data of selectable characters.

FIG. 5A shows a character data area in the ECU 10 after candidate characters have been input by the character input and the candidate characters are limited. The blank spaces 27 are character data areas of characters that cannot be selected because the candidate characters are limited.

FIG. 5B shows the character data area in the ECU 10 after the processes of steps S22, S24 and S26 have been performed on the state of FIG. 5A. As shown in FIG. 5B, character data of selectable characters adjacent to non-selectable characters are allocated to the character data areas (blank spaces 27) of the non-selectable characters. For this allocation processing, it is preferable to allocate the character data of one or two selectable characters adjacent to the blank spaces 27. More concretely, allocation processing (blank space candidate definition processing), as shown in FIG. 5B, is performed such that in the case where the number of blank spaces is even, character data of the selectable characters on the two sides of the blank spaces are allocated to the blank spaces 27 equally, and in the case where the number of blank spaces is odd, the blank space in the center of the blank spaces is defined by character data of the selectable character on the left side of the blank spaces, and then the others are allocated equally similarly to the case of an even number.

Furthermore, FIG. 6 is an explanatory diagram showing other internal processing content of the ECU 10, which temporarily defines the display areas of non-selectable characters in the character list as selectable characters. FIG. 6 shows a case where, where the fifty sounds of Hiragana characters are used as a character list, the character data of selectable characters vertically adjacent is allocated temporarily to the data areas (blank spaces 28) of characters that cannot be selected due to the limitation in retrieval.

In step S30, the list display section 21 is selected by the input operation section 13, and it is determined whether decision processing has been performed or not. If the determination result is yes, the flow proceeds to step S32, while if the determination result is no, the flow returns to the process of step S12.

In step S32, display processing of the list of input candidates retrieved is performed. Then in step S34, it is determined whether the input candidates have been finalized or not. If the determination result is yes, the flow proceeds to step S36, while if the determination result is no, the flow returns to step S32. In step S36, the finalized input candidates are set to map data as destinations, and input processing is performed.

In this manner, even if the number of selectable characters changes, predetermined characters can be selected by the same operation as before limitation. Therefore, it is possible to maintain the feeling of input operation. In addition, if the display screen is checked, it is possible to reduce the amount of processing and the number of operations, and hence it is possible to further enhance the operability and convenience. Here, the blank space candidate definition is not limited to the above-described embodiment. It is possible to change the processing of the blank space candidate definition appropriately, such as by defining all of the blank spaces as selectable characters of any one of the above, below, right, or left, for example.

The content of the present invention is described based on the embodiment as above. However, naturally the content of the present invention is not limited to the above embodiment. For example, in the present embodiment, a case is described in which an information retrieving apparatus is installed in a vehicle. However, it is not limited to this, and it can be used in the case where it is installed in another moving object or the like. Furthermore, data constituting a character list may include not only the abovementioned alphabet or the fifty sounds, but also pictographs, symbols, numbers, or the like. Moreover, in the present embodiment, it is installed in a moving object. However, it is not limited to this, and it is also applicable to objects other than a moving object, such as a portable terminal, a fixed information terminal, and the like. Furthermore, it is also applicable to apparatus other than a navigation apparatus, for example, an information retrieving apparatus that retrieves and limits information, such as telephone book retrieval, retrieval of an address book, and the like.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An information retrieving apparatus which retrieves predetermined information according to an input of text information, comprising:

an input operation section that selects characters from a character list that has a fixed predetermined number of character data areas for containing characters arranged in a fixed predetermined character sequence and performs input instructions of selected characters, wherein the input operation section is moved by an operator to select characters from the character list and a decision of a selected character is made by pressing on the input operation section;

a display section that displays said character list on a character list display section and input instructed characters on a selected character display section that are input according to the input instructions performed by said input operation section;

a succeeding input candidate character selection section that retrieves input candidate characters containing said input instructed characters and extracts a character immediately after said input instructed characters in the retrieved input candidate as a candidate character;

a candidate definition processing section that temporarily allocates said candidate character to a display area of the character list in said display section that contains non-selectable characters, so that they can be selected using said input operation section, wherein said non-selectable characters vary based on the extracted candidate character; and a candidate display section that displays characters in said display area where the character data areas of said non-selectable characters are replaced temporarily by said candidate character by said candidate definition processing section, and differentiating said display area from a display area of the character list that contains selectable characters, wherein the character list displayed in the display area by the candidate display section maintains the predetermined number of character data areas arranged in the predetermined character sequences including the selectable characters and non-selectable characters and the character data areas of non-selectable characters in the character list are temporarily defined as character data of selectable characters.

2. An information retrieving apparatus according to claim 1, wherein said candidate definition processing section performs a character blank space process to temporarily transfer the display data areas of non-selectable characters into at least one blank space and temporarily defines the at least one blank space of non-selectable characters as character data of selectable characters.

3. An information retrieving apparatus according to claim 2, wherein said candidate definition processing section, based on the number of the at least one blank space, sets either one or two candidate characters adjacent to said at least one blank space of non-selectable characters to be allocated to the at least one blank space.

4. An information retrieving apparatus according to claim 1, wherein the succeeding input candidate character selection section retrieves input candidate characters containing said input instructed characters from place names and facility names stored in a map database.

5. An information retrieving apparatus according to claim 1, wherein the input operation section includes a dial.

* * * * *